No. 667,553.  
G. A. MUMFORD.  
VALVE.  
(Application filed Dec. 10, 1900.)  
Patented Feb. 5, 1901.
(No Model.)
2 Sheets—Sheet 1.
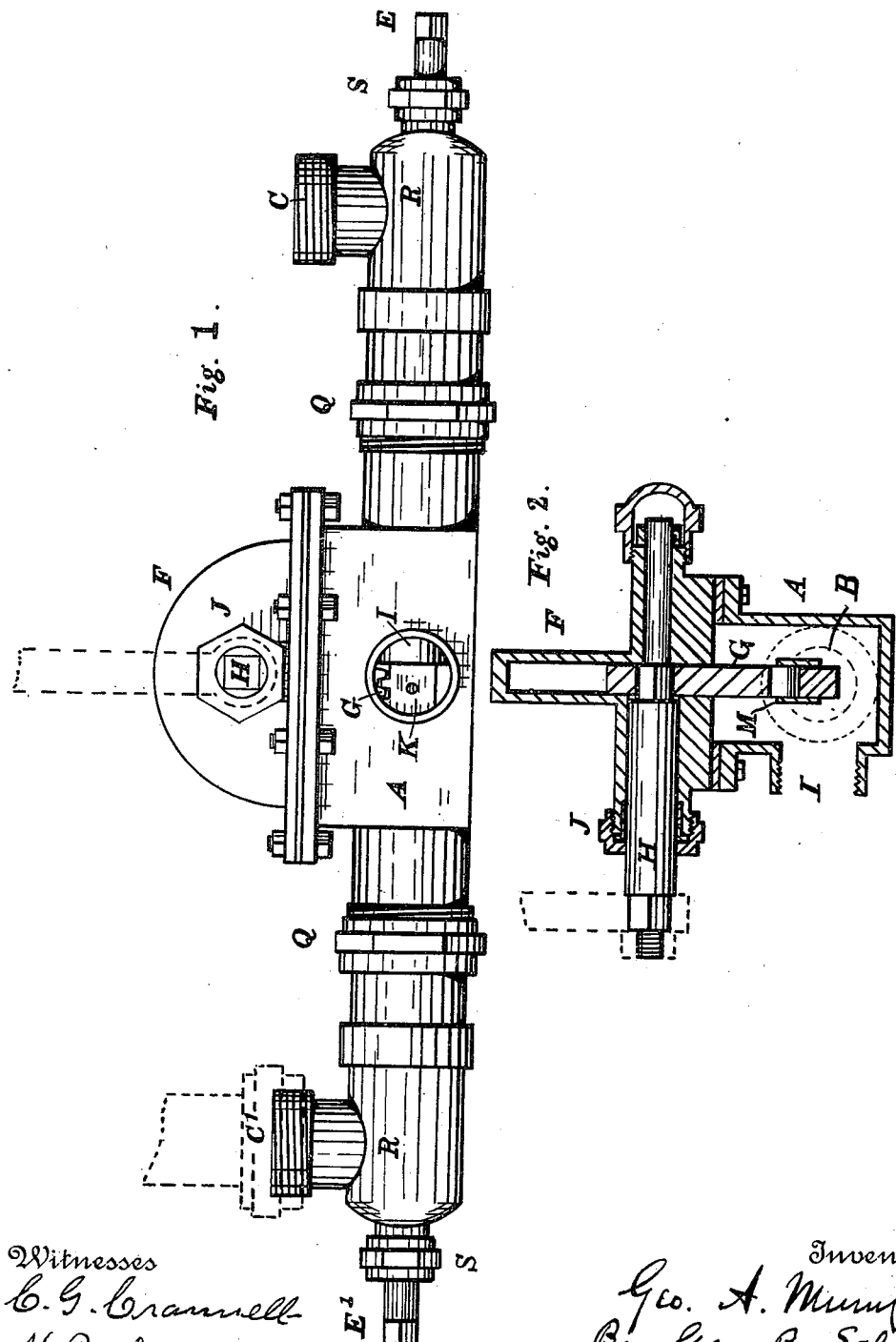
Witnesses  
C. G. Crannell  
H. R. Selden.
Inventor  
Geo. A. Mumford  
By Geo. B. Selden,  
Attorney No. 667,553. Patented Feb. 5, 1901.
G. A. MUMFORD.
VALVE.
(Application filed Dec. 10, 1900.)
(No Model.) 2 Sheets—Sheet 2.
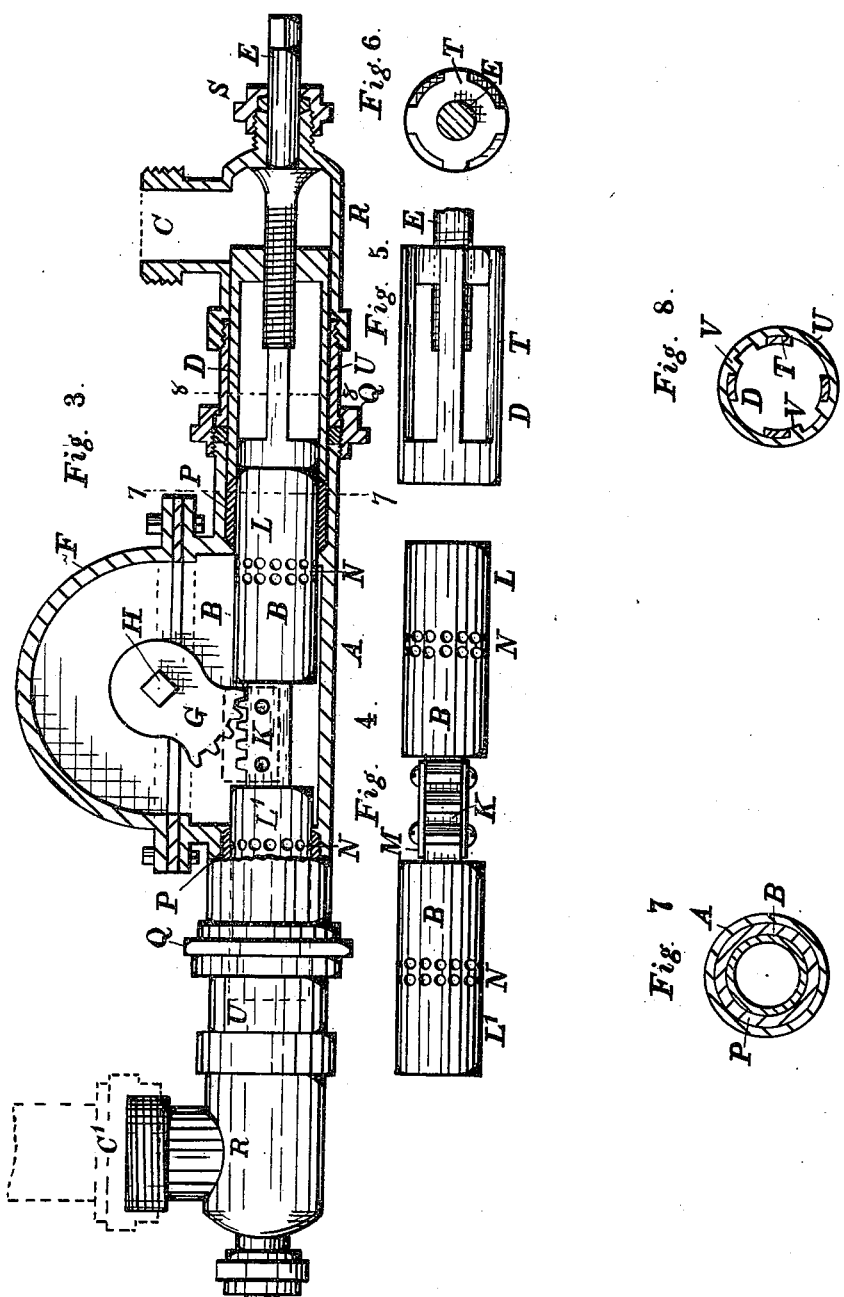
Witnesses
C. G. Crannell
H. R. Selden.
Inventor
Geo. A. Mumford.
By Geo. B. Selden,
Attorney

UNITED STATES PATENT OFFICE.

GEORGE A. MUMFORD, OF ROCHESTER, NEW YORK.

VALVE.

SPECIFICATION forming part of Letters Patent No. 667,553, dated February 5, 1901.

Application filed December 10, 1900. Serial No. 39,348. (No model.)

*To all whom it may concern:*

Be it known that I, GEORGE A. MUMFORD, a citizen of the United States, residing at Rochester, Monroe county, New York, have invented certain Improvements in Valves, of which the following is a specification, reference being had to the accompanying drawings.

My present invention relates to certain improvements on the valve patented to me November 14, 1899, No. 637,010, whereby the construction and operation of the same are cheapened and facilitated.

My improvements are fully described and illustrated in the following specification and the accompanying drawings, the novel features thereof being specified in the claims annexed to the said specification.

In the accompanying drawings, representing my improved valve, Figure 1 is a side elevation. Fig. 2 is a central section on the line 2 2, Fig. 1. Fig. 3 is a partial longitudinal section. Fig. 4 represents the piston-valve and rack detached. Fig. 5 represents one of the followers. Fig. 6 is an end view of the same. Fig. 7 is a section of the piston and casing on the line 7 7, Fig. 3. Fig. 8 is a section of the follower and elbow on the line 8 8, Fig. 3.

My improved valve comprises the casing A, inclosing the reciprocating piston-valve B, by the movement of which the steam or water is diverted from one of the passages C C' to the other. The valve consists of two parts L L', which are packed by the followers D and their adjusting-screws E E'. The current may enter or escape by the orifice I, as may be required by the conditions under which the valve is used. The casing is cylindrical and bored out to fit the valve. It is provided at its center with the removable cap F, which incloses the toothed segment G, by which the valve is shifted. A shaft H, extending laterally outside of the cap, is attached to the segment and is provided with a handle by which the valve is operated.

J represents a stuffing-box for the shaft H.

The cap is detachably secured to the casing by suitable flanges and screws, packing being employed, if desired. The toothed segment G meshes with the rack K, which connects the parts L L' of the valve B together.

On each side of the rack are secured the plates M, which serve to keep the rack in proper relation to the segment.

The valve is provided with the orifices N N, through which the pressure escapes from the central chamber to the pipes C C', according to the position of the valve. In the position shown in full lines in Fig. 3 the current entering at I would pass through the ports N in the right-hand part of the valve and thence traveling through the follower D escape by C, the other passage C' being cut off. C may, however, be the inlet, if preferred. The follower is made in any suitable way, so that it may act to compress the packing P on the valve, permit the passage of the current through it, and be operated by the adjusting-screw E. The cylindrical ends of the casing are provided with suitable annular recesses for the packing P. The follower D is ring-shaped at its inner end and is arranged to be forced against the packing by the screw E, so as to keep the piston tight and prevent leakage. It will be observed that this operation is performed from the outside and without disconnecting or disturbing any of the parts or pipes. A screw connection Q serves to attach the elbow R to the central portion of the casing. The adjusting-screw passes through a stuffing-box S on the end of the elbow and is threaded into the outer end of the follower. The screw connection Q permits the passage C to be set at any required angle with a pipe attached to the orifice I. The follower, as shown, is provided with a series of longitudinal bars T, which permit the passage of the steam or water. The casing U is provided with one or more interior ribs V, Fig. 8, which bear against the bars T and prevent the follower from rotating axially.

I claim—

1. The combination with the casing provided with the removable cover, of the inlet and outlet passages, two of which are oppositely located, the reciprocating piston-valve and means for shifting its position, the hollow followers at each end of the valve, and the central adjusting-screws adapted to shift the followers from the outside, as and for the purposes set forth.

2. The combination with the casing provided with the removable cover, of the inlet and outlet passages, two of which are oppositely located, the reciprocating piston-valve and means for shifting its position, the hollow followers at each end of the valve, the detachable elbows at the ends of the casing and the central adjusting-screws adapted to shift the followers from the outside, as and for the purposes set forth.

3. The combination with the casing provided with the removable cover, of the inlet and outlet passages, two of which are oppositely located, the reciprocating piston-valve and means for shifting its position, the hollow followers at each end of the valve, the detachable elbows at the ends of the casing, the screw-coupling for the elbows, and the central adjusting-screw adapted to shift the followers from the outside, as and for the purposes set forth.

GEORGE A. MUMFORD.

Witnesses:
H. R. SELDEN,
C. G. CRANNELL.